US012783198B2

United States Patent

(12) United States Patent
Chen et al.

(10) Patent No.: US 12,783,198 B2
(45) Date of Patent: Nov. 3, 2026

(54) ELECTRONIC DISPLAY DEVICE AND OPERATION METHOD OF ELECTRONIC DISPLAY DEVICE FOR MULTI-SPLIT-SCREEN DISPLAY

(71) Applicant: Realtek Semiconductor Corp., HsinChu (TW)

(72) Inventors: Ding-Wei Chen, HsinChu (TW); Yi-Wen Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 19/403,272

(22) Filed: Nov. 28, 2025

(65) Prior Publication Data

US 2026/0133740 A1 May 14, 2026

Related U.S. Application Data

(60) Provisional application No. 63/727,157, filed on Dec. 2, 2024.

(30) Foreign Application Priority Data

Nov. 21, 2025 (TW) ................................ 114145472

(51) Int. Cl.
*G06F 3/14* (2006.01)
*G06F 3/0354* (2013.01)
*G06F 3/16* (2006.01)

(52) U.S. Cl.
CPC ........ *G06F 3/1423* (2013.01); *G06F 3/03543* (2013.01); *G06F 3/165* (2013.01)

(58) Field of Classification Search
CPC ..... G06F 3/03543; G06F 3/1423; G06F 3/165
See application file for complete search history.

(56) References Cited

U.S. PATENT DOCUMENTS 7,844,917 B2 * 11/2010 Rigolet ................. G06F 3/0483 715/788
RE43,462 E * 6/2012 Washino ............ H04N 21/4622 348/E7.086
12,468,496 B2 * 11/2025 Lai ........................ G06F 3/1423
(Continued)

FOREIGN PATENT DOCUMENTS

WO WO-2022146108 A1 * 7/2022 ....... H04N 21/43635

OTHER PUBLICATIONS

Machine translation of WO-2022146108-A1. (Year: 2026).*

*Primary Examiner* — Michael Pervan
(74) *Attorney, Agent, or Firm* — Winston Hsu

(57) ABSTRACT

An operation method of an electronic display device includes: receiving multiple data sources; providing a display screen to respectively display the multiple data sources of the multiple data source devices by activating multiple different windows; providing a peripheral control circuit to receive a user control signal from an external peripheral device to transfer the user control signal into the controller circuit; and, controlling the display screen based on the user control signal to control the display screen respectively displaying the multiple data sources through multiple different windows, to respectively and dynamically control and manage the picture positions on the display screen and dynamically controlling the window sizes of the multiple different windows.

10 Claims, 3 Drawing Sheets

(56) References Cited

U.S. PATENT DOCUMENTS

| | | | | |
|---|---|---|---|---|
| 2024/0378007 | A1* | 11/2024 | Lai | G06F 3/1423 |
| 2024/0406482 | A1* | 12/2024 | Lin | H04N 21/436 |
| 2025/0251892 | A1* | 8/2025 | Lin | G06F 3/1423 |
| 2026/0093431 | A1* | 4/2026 | Wang | G06F 3/1423 |

* cited by examiner

ELECTRONIC DISPLAY DEVICE AND OPERATION METHOD OF ELECTRONIC DISPLAY DEVICE FOR MULTI-SPLIT-SCREEN DISPLAY

CROSS REFERENCE TO RELATED APPLICATIONS

This application claims the benefit of U.S. Provisional Application No. 63/727,157, filed on Dec. 2, 2024. The content of the application is incorporated herein by reference.

BACKGROUND OF THE INVENTION

1. Field of the Invention

The present invention relates to the field of an electronic display device and human-computer interactions, and more particularly to a user interface (UI) design of a multi-split-screen display.

2. Description of the Prior Art

In the prior art, multi-split-screen displays mostly use fixed split screen layout modes such as the equally divided display layout or the proportionally divided display layout. However, these prior art techniques lack flexibility and cannot dynamically adjust the size of split screens or the position of windows. Furthermore, interaction functions (e.g. volume control or external device management) between multiple data source devices and the display often require additional hardware support or software support. Thus, the operations become complex and not intuitive.

SUMMARY OF THE INVENTION

Therefore one of the objectives of the present invention is to provide an electronic display device and a corresponding operating method, to solve the problems of the prior art.

According to embodiments of the present invention, an electronic display device is disclosed. The electronic display device is respectively and externally coupled to multiple data source devices, and comprises multiple interface circuits, a controller circuit, a display screen, and a peripheral control circuit. The multiple interface circuits are respectively coupled to the multiple data source devices. The controller circuit is respectively coupled to the multiple data source devices through the multiple interface circuits and used for receiving multiple data source contents from the multiple data source devices. The display screen, coupled to the controller circuit, is controlled by the controller circuit to respectively display the multiple data source contents of the multiple data source devices by activating multiple different windows, each window corresponding to a data source. The peripheral control circuit, coupled to the controller circuit and an external peripheral device, is used for receiving a user control signal transmitted from the external peripheral device to transfer the user control signal into the controller circuit. The controller circuit is used for controlling the display screen according to the user control signal to control the display screen to display the multiple data source contents through the multiple different windows, so as to dynamically control and manage multiple different picture positions of the multiple different windows on the display screen and to dynamically control window sizes of the multiple different windows, respectively. A specific window has a window behavior control item and a data source behavior control item. The window behavior control item comprises at least one of a minimize operation, a maximize operation, a restore operation, and a close operation. The data source behavior control item comprises at least one of a volume adjustment operation, a mouse mapping operation, a data source device interaction control operation, and other device behavior setting operations.

According to the embodiments, an operating method of an electronic display device is disclosed. The electronic display device is respectively and externally coupled to multiple data source devices. The operating method comprises: providing multiple interface circuits respectively coupled to the multiple data source devices; providing a controller circuit, respectively coupled to the multiple data source devices through the multiple interface circuits, to receive multiple data source contents from the multiple data source devices; providing a display screen to be controlled by the controller circuit to respectively display the multiple data source contents of the multiple data source devices by activating multiple different windows, each window corresponding to a data source; providing a peripheral control circuit to receive a user control signal transmitted from the external peripheral device to transfer the user control signal into the controller circuit; and, controlling the display screen according to the user control signal to control the display screen to display the multiple data source contents through the multiple different windows, so as to dynamically control and manage multiple different picture positions of the multiple different windows on the display screen and to dynamically control window sizes of the multiple different windows, respectively. A specific window has a window behavior control item and a data source behavior control item. The window behavior control item comprises at least one of a minimize operation, a maximize operation, a restore operation, and a close operation. The data source behavior control item comprises at least one of a volume adjustment operation, a mouse mapping operation, a data source device interaction control operation, and other device behavior setting operations.

These and other objectives of the present invention will no doubt become obvious to those of ordinary skill in the art after reading the following detailed description of the preferred embodiment that is illustrated in the various figures and drawings.

DETAILED DESCRIPTION

The embodiments of the present invention pertain to the field of electronic display devices and human-computer interaction, and aim at providing a user interface (UI) design of a multi-split-screen display and an operating system and method based on the windowing technology to manage and control the display and interaction behaviors of multiple data source devices.

Figure 1:
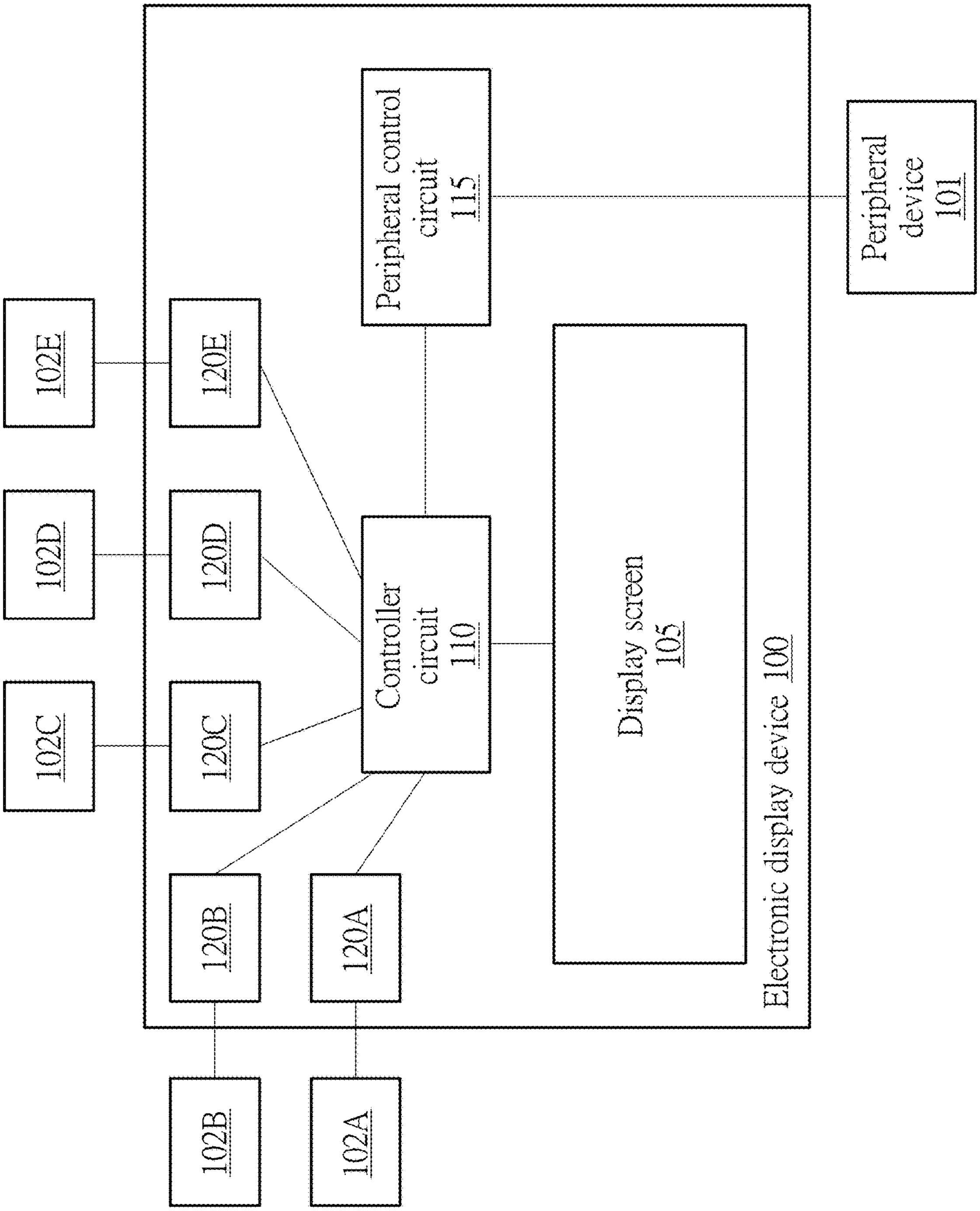
FIG. 1 is a schematic diagram of an electronic display device according to an embodiment of the present invention.

Please refer to FIG. 1. FIG. 1 is a schematic diagram of an electronic display device 100 according to an embodiment of the present invention. The electronic display device 100 is a novel multi-split-screen display device with a user interface of multi-split-screen display. The user interface for example includes a display screen and at least one peripheral device, to allow the display screen to display multiple data source contents of multiple data source devices for a user and to allow the user to manage and control the multiple data source devices through the at least one peripheral device. The electronic display device 100 for example includes a display screen 105, a controller circuit 110, at least one peripheral control circuit 115, and multiple interface circuits 120A-120E. The number of interface circuits is not intended to be a limitation of the present invention.

In this embodiment, the electronic display device 100 is external coupled to multiple data source devices 102A-102E, respectively. The multiple interface circuits 120A-120E are respectively coupled to the multiple data source devices 102A-102E through multiple wired connections (or can be through multiple wireless connections). The multiple wired connections can be wired connections of different transmission standards such as communication interfaces of Universal Serial Bus (USB Type-C, hereinafter referred to as Type-C), High-Definition Multimedia Interface (hereinafter referred to as HDMI), and Display Port (hereinafter referred to as DP), or can be multiple wired connections of the same transmission standard such as multiple Type-C connections, or can also be multiple wireless connections or a combination of multiple wired and wireless connections. The multiple data source devices 102A-102E can be different electronic devices of the same type or different electronic devices of different types, e.g. personal computers, laptop computers, or mobile phone devices, etc.

The controller circuit 110 is respectively coupled to the multiple data source devices 102A-102E through the multiple interface circuits 120A-120E to receive the multiple data source contents from the multiple data source devices 102A-102E. The display screen 105 is coupled to the controller circuit 110 and is controlled by the controller circuit 110 to display the multiple data source contents of the multiple data source devices 102A-102E by activating multiple different windows. Each different window corresponds to a different data source. The peripheral control circuit 115 is coupled to the controller circuit 110 and an external peripheral device 101, and it is used for receiving a user control signal transmitted from the external peripheral device 101 to transfer the user control signal into the controller circuit 110. For example, the external peripheral device 101 is a mouse device. In other embodiments, the external peripheral device 101 can also be a keyboard device (but not limited). The controller circuit 110 is used for controlling the display screen 105 according to the user control signal to control the display screen 105 to display the multiple data source contents through the multiple different windows, so as to dynamically control and manage multiple different picture positions of the multiple different windows on the display screen 105 and to dynamically control the window sizes of the multiple different windows. For example, a specific window has a window behavior control item and a data source behavior control item. The window behavior control item includes at least one of a minimize operation, a maximize operation, a restore operation, a close operation. The data source behavior control item includes at least one of a volume adjustment operation, a mouse mapping operation, a data source device interaction control operation/function, and other device behavior setting operations.

Figure 2:
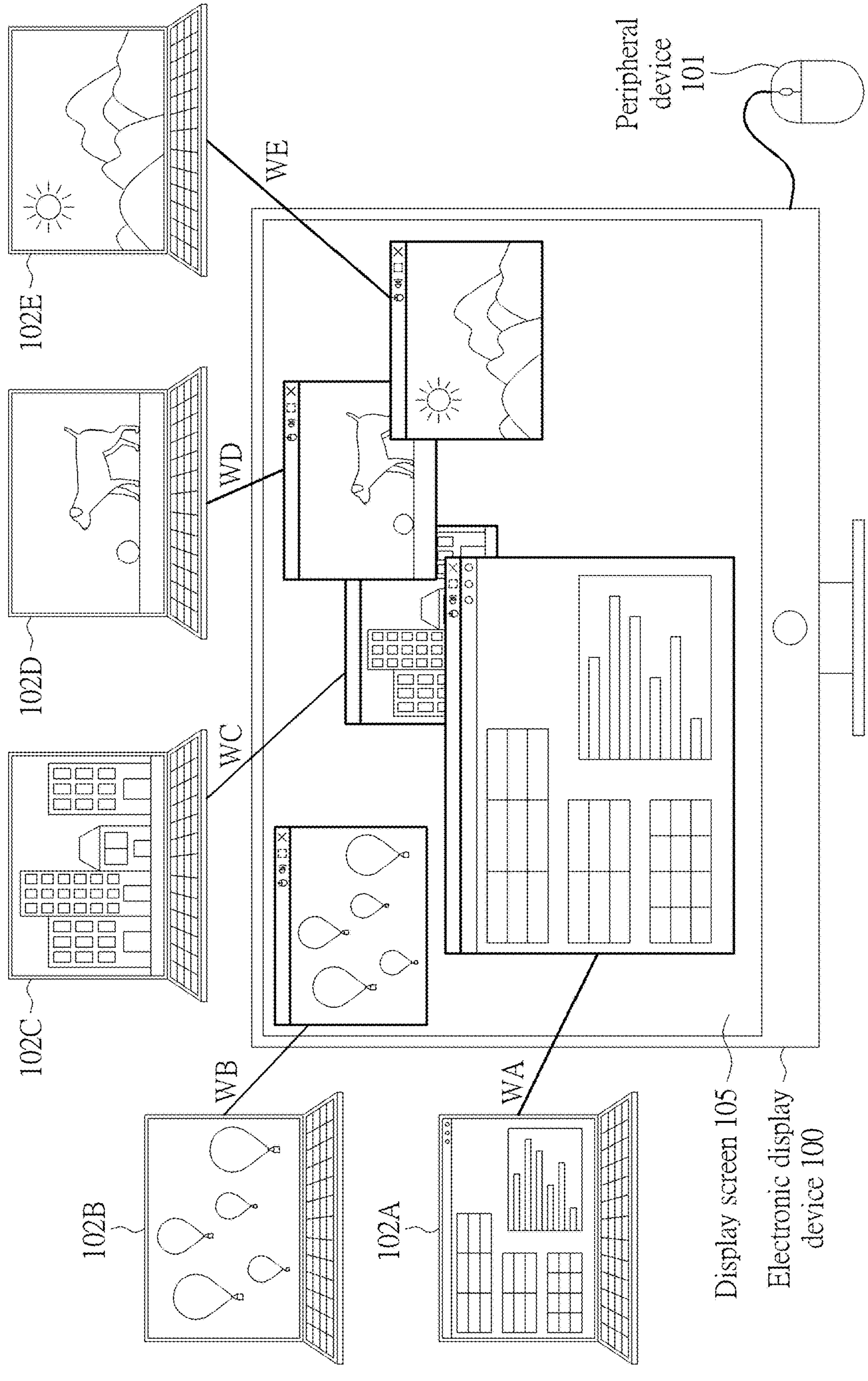
FIG. 2 is a schematic diagram illustrating an example of a multi-split-screen display on the display screen of the electronic display device shown in FIG. 1 according to an embodiment of the present invention.

FIG. 2 is a schematic diagram illustrating an example of a multi-split-screen display on the display screen 105 of the electronic display device 100 shown in FIG. 1 according to an embodiment of the present invention. As shown in FIG. 2, the user interface of the multi-split-screen display of the electronic display device 100 can simultaneously present and display the data from multiple data source devices 102A-102E in multiple independent and different windows. The window sizes, window positions, and stacking orders of the multiple independent and different windows can be dynamically adjusted by an external peripheral device 101 (e.g. a keyboard device or a mouse device as shown in FIG. 2) connected to the electronic display device 100 via a wired or wireless connection. The external peripheral device 101 is operated by a user. The stacking order is the Z-order of the window, i.e. the window's position in the stack of overlapping windows. This window stack extends outward along an imaginary axis, the Z-axis, and can extend outward the screen. The window at the top of the stacking order overlaps all other windows. For example, in FIG. 2, the multi-split-screen display of the display screen 105 uses multiple windows WA, WB, WC, WD, WE to respectively and simultaneously display the different data source contents of the data source devices 102A-102E independently. For example (but not limited), the data source devices 102A-102E in FIG. 2 can be different laptop computers which can be connected to the electronic display device 100 via different HDMI transmission cables of the same transmission standard, and the electronic display device 100 can then simultaneously and independently display multiple different data source contents for the user which operates the external peripheral device 101. In other embodiments, the data source devices 102A-102E may be a combination of different data source devices that have different types, different specifications, and different operating system platforms to store data sources, e.g. personal computers, mobile phone devices, etc. That is to say, each independent window corresponds to the data source content of a different data source device, e.g. the data source content from connection cables of different transmission standards like HDMI, Type-C, or DP communication interfaces, and is used to display the data source content of that data source device.

Thus, by introducing an operating mode of a windowed multi-split-screen display, the present invention can provide a flexible multi-split-screen management function and support the simultaneous display of multiple data sources such as simultaneous input from HDMI and Type-C communications. Furthermore, the present invention also allows the user to adjust the size and position of each of independent windows and provide a more intuitive user interface to simplify the user experience of operating a multi-split-screen display. For example, in an initial setting, the controller circuit 110 controls the display screen 105 to display the window sizes in a random manner (or in a predetermined fixed manner), window positions, and stacking orders of the multiple independent and different windows. Then, the user can control the peripheral device 101 (e.g., a mouse device) to drag the windows to change the window sizes, window positions, or stacking orders.

Figure 3:
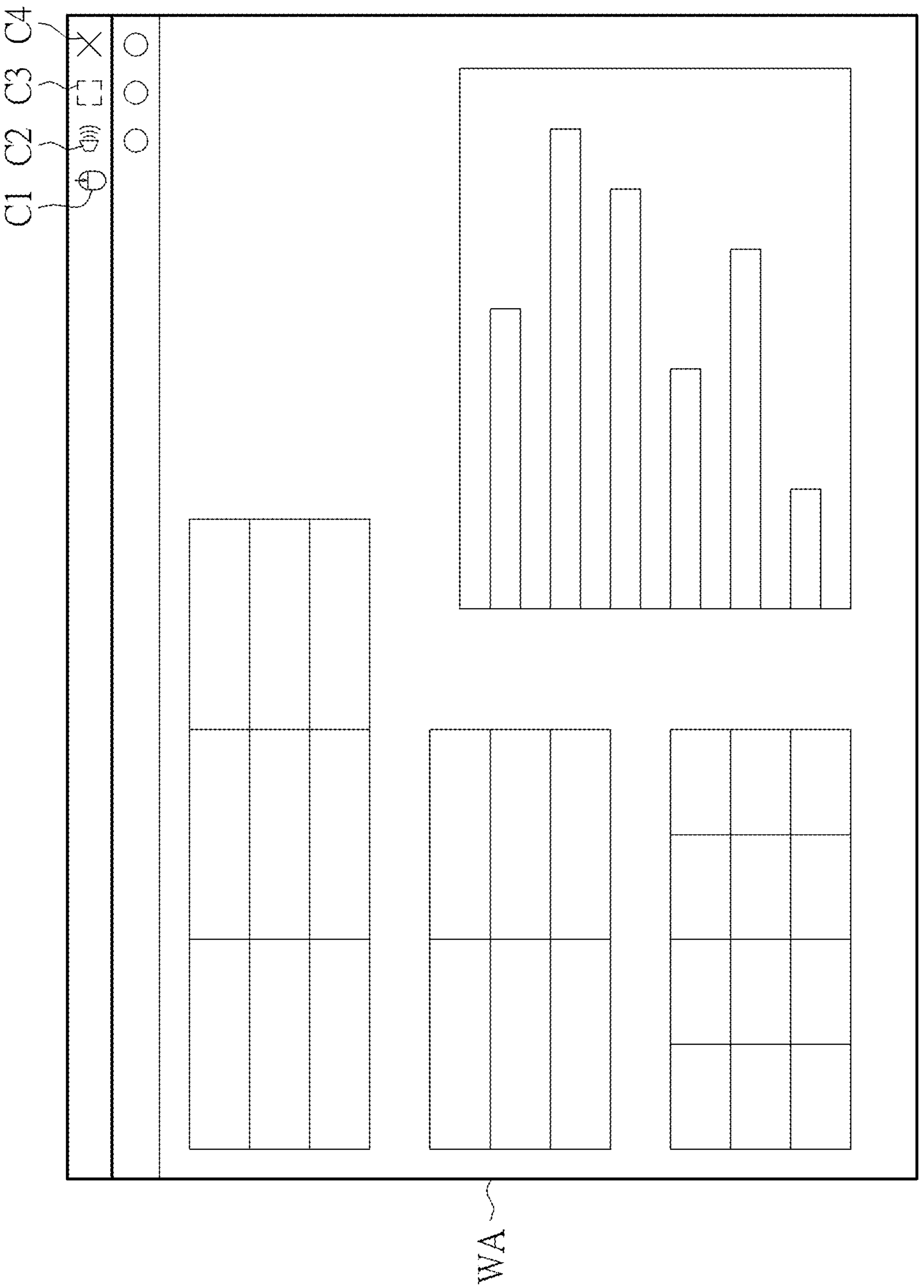
FIG. 3 is a schematic diagram of an individual window WA shown in FIG. 2 according to an embodiment of the present invention.

Furthermore, the present invention can achieve efficient interactive control operations between the electronic display device 100 and the multiple data source devices 102A-102E through one or more different window control items (i.e. window control options), e.g. to perform volume control operation/function and mouse mapping operation/function. FIG. 3 is a schematic diagram of an individual window WA shown in FIG. 2 according to an embodiment of the present invention. Each individual window such as the individual window WA shown in FIG. 2 includes two types of window control items, e.g. a window behavior control item and a data source behavior control item. The window behavior control item for example includes a window minimize operation, a window maximize operation, a window restore operation, and/or a window close operation. The data source behavior control item for example includes a volume control operation, a mouse mapping operation, and/or other interactive options.

For example, at the upper right corner of the individual window WA shown in FIG. 3, the window WA includes four control items which are a mouse mapping control item C1, a volume control item C2, a window maximize control item C3, and a window close control item C4, from left to right. For example, the mouse mapping control item C1 is a data source behavior control item, and its mouse mapping operation when being activated is used by the controller circuit 110 to allow/permit the mouse device 101 connected to the electronic display device 100 to directly operate a specific window (i.e., WA) to manage a specific data source content of a specific data source device (i.e., 102A) corresponding to the specific window WA. In other words, the mouse mapping control item C1 is used to enable/activate the mouse mapping function/operation to allow the user to use a mouse device 101 connected to the electronic display device 100 to control the operations and data of a data source device 102A corresponding to the individual window WA. Instead, when the mouse mapping control item C1 indicates that the mouse mapping function is disabled, it means the user is not allowed to use the mouse device 101 to control the operations and data of the data source device 102A corresponding to the individual window WA.

In addition, the volume control item C2 is a data source behavior control item, and its volume adjustment operation is used to change a volume output level of a specific window WA corresponding to a specific data source device 102A by adjusting a volume control item on that specific window WA. For example, when the user moves the cursor of the mouse device 101 close to, hovers over, or clicks on the volume control item C2, the controller circuit 110 can control the display screen 105 to display and show a pop-up volume control panel at the volume control item C2, so that the user then may directly adjust the volume output level of the data source device 102A by using the mouse device 101. Alternatively, in another embodiment, the volume control item C2 is used to indicate whether to enable/activate or disable/de-activate the volume output operation. For example, when the volume output operation is enabled/activated, the controller circuit 110 can control the display screen 105 to display the volume control item C2 in a specific color (or in a specific pattern) to indicate that the volume output operation is enabled. Then, when the user uses the cursor of the mouse device 101 to click on the volume control item C2 to make the volume output operation switch from an enabled state into a disabled state, the controller circuit 110 can control the display screen 105 to display the volume control item C2 in another color (or in another pattern) to indicate that the volume output operation is disabled/de-activated.

In addition, the window maximize control item C3 and the window close control item C4 are window behavior control items. The window maximize control item C3 is used to allow a user to click by using the mouse device 101 to control and maximize the individual window WA to maximize the display image of the data content of the corresponding data source device 102A. The window close control item C4 is used to allow a user to click by using the mouse device 101 to close/disable the display image of the data content of the corresponding data source device 102A.

Furthermore, in other embodiments, the types of the aforementioned window control items can be further expanded to include different types of control items such as a different device switching control item, a peripheral device control items (e.g., a keyboard control items), and so on, to enhance the interactive capabilities between the electronic display device 100 and the multiple data source devices 102A-102E. In one embodiment, the multiple data source behavior control items respectively possessed by the multiple different windows respectively include multiple device switching control items. When the multiple device switching control items are enabled/activated, the multiple different windows respectively and simultaneously display the multiple data source contents for the user. Then, the controller circuit 110 based on the user control signal (i.e., the user's operation of the peripheral device 101) can cyclically switch and select a specific window (e.g., WA) among the multiple different windows WA-WE to control the content of a specific data source corresponding to that specific window WA, without moving the cursor position corresponding to the peripheral device 101 onto the specific window WA. For example, the electronic display device 100 can further support the parallel display of multiple data sources and allow switching operations between the multiple data sources. The multiple split screen windows corresponding to the multiple data sources respectively have the aforementioned multiple device switching control items. When the user enables (or activates) the multiple device switching control items by using the peripheral device 101 such as a mouse device (or keyboard device), the multiple split screen windows can simultaneously display the multiple data source contents for the user, and then the user can simply use a button (e.g., the middle button or scroll wheel button) on the peripheral device such as the mouse device to cyclically switch between the multiple split screen windows (i.e., windows WA-WE). For example, the user can use the scroll wheel of the scroll wheel button of the mouse device to cyclically switch and select a specific split screen window (e.g., WA) among the multiple enabled/activated split screen windows WA-WE and to control the specific split screen window WA display the content of a specific data source, without needing to move the cursor position of the mouse device 101 onto the specific split screen window WA. This can effectively simplify the user's operation of switching and controlling multiple data source devices. In this condition, the controller circuit 110 may control the display screen 105 to directly display the cyclically selected split screen window on the top layer.

Furthermore, in one embodiment, the split screen windowing function of the electronic display device 100 can also allow the user to dynamically adjust the split screens, e.g. dragging the window positions and changing the window sizes of the split screens.

It should be noted that the multiple data source devices 102A-102E can be different electronic devices of the same type or different electronic devices of different types, e.g. personal computers, laptop computers, mobile phone devices, e-paper display devices, and other electronic devices having different platforms or different operating systems. The electronic display device 100 is a smart device and can establish multiple signal channels with the multiple data source devices 102A-102E respectively through the multiple interface circuits 120A-120E. Therefore, for example, the instructions generated by the peripheral device 101 can be transferred into a specific data source device through a specific signal channel. When a specific signal channel is enabled, the peripheral device 101, which is originally used to control the electronic display device 100, can control the data source content projected onto the display screen 105 from the specific data source device through the signal channel. Instead, when the specific signal channel is disabled, the instructions from the peripheral device 101 are only used to control the electronic display device 100. That is, the specific signal channel established between the operating system in the electronic display device 100 and the operating system of the specific data source device can transmit the control instructions, to send the control instructions of the peripheral device 101 to an operating system of the specific data source device (e.g., a mobile phone device) to smoothly control and display the mapped content.

In summary, the main functions of the electronic display device 100 of the embodiments of the present invention are used to provide a free adjustment of the multi-split-screen display mode (including dynamic changes in window size and position) and to enhance the interaction functions between the electronic display device 100 and multiple data source devices of different types. This achieves an intuitive management of functions such as volume and mouse through window control items as well as also supports the simultaneous display of multiple data sources. The main advantages of the electronic display device 100 comprise: providing an innovative user interface that uses a windowed design of the multi-split-screen display to manage multiple data sources to thereby improve the flexibility of the display operations; integrating a basic behavior control of each split screen window with the interactive control function of a corresponding data source device; and, allowing all split screens and device interaction settings to be completed by using merely the mouse operations without the need of extra hardware or software, to enhance the user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic display device, respectively and externally coupled to multiple data source devices, comprising:

multiple interface circuits, respectively coupled to the multiple data source devices;

a controller circuit, respectively coupled to the multiple data source devices through the multiple interface circuits, for receiving multiple data source contents from the multiple data source devices; and a display screen, coupled to the controller circuit, to be controlled by the controller circuit to respectively display the multiple data source contents of the multiple data source devices by activating multiple different windows, each window corresponding to a data source; and a peripheral control circuit, coupled to the controller circuit and an external peripheral device, for receiving a user control signal transmitted from the external peripheral device to transfer the user control signal into the controller circuit;

wherein the controller circuit is used for controlling the display screen according to the user control signal to control the display screen to display the multiple data source contents through the multiple different windows, so as to dynamically control and manage multiple different picture positions of the multiple different windows on the display screen and to dynamically control window sizes of the multiple different windows, respectively; a specific window has a window behavior control item and a data source behavior control item; the window behavior control item comprises at least one of a minimize operation, a maximize operation, a restore operation, and a close operation; and, the data source behavior control item comprises at least one of a volume adjustment operation, a mouse mapping operation, a data source device interaction control operation, and other device behavior setting operations.

2. The electronic display device of claim 1, wherein the peripheral device is a mouse device.

3. The electronic display device of claim 2, wherein the mouse mapping operation of the data source behavior control item when being activated is used to allow the mouse device, which is connected to the electronic display device, to directly operate the specific window to manage a specific data source content of a specific data source device corresponding to the specific window.

4. The electronic display device of claim 1, wherein the multiple interface circuits respectively support multiple different wired connections of different standards or respectively support the multiple different wired connections corresponding to a same standard, so as to be respectively coupled to the multiple data source devices.

5. The electronic display device of claim 1, wherein the volume adjustment operation of the data source behavior control item is used for changing a volume output level of a specific window corresponding to a specific data source device by adjusting a volume control item on the specific window.

6. The electronic display device of claim 1, wherein the multiple data source behavior control items respectively comprised by the multiple different windows respectively include multiple device switching control items; when the multiple device switching control items are activated, the multiple different windows respectively and simultaneously display the multiple data source contents for a user, and the controller circuit switches between the multiple different windows to select a specific window to control a content of a specific data source corresponding to the specific window according to the user control signal, without moving a cursor position corresponding to the peripheral device onto the specific window.

7. An operating method of an electronic display device, the electronic display device being respectively and externally coupled to multiple data source devices, and the operating method comprises:

providing multiple interface circuits respectively coupled to the multiple data source devices;

providing a controller circuit, respectively coupled to the multiple data source devices through the multiple interface circuits, to receive multiple data source contents from the multiple data source devices;

providing a display screen to be controlled by the controller circuit to respectively display the multiple data source contents of the multiple data source devices by activating multiple different windows, each window corresponding to a data source;

providing a peripheral control circuit to receive a user control signal transmitted from the external peripheral device to transfer the user control signal into the controller circuit; and controlling the display screen according to the user control signal to control the display screen to display the multiple data source contents through the multiple different windows, so as to dynamically control and manage multiple different picture positions of the multiple different windows on the display screen and to dynamically control window sizes of the multiple different windows, respectively;

wherein a specific window has a window behavior control item and a data source behavior control item; the window behavior control item comprises at least one of a minimize operation, a maximize operation, a restore operation, and a close operation; and, the data source behavior control item comprises at least one of a volume adjustment operation, a mouse mapping operation, a data source device interaction control operation, and other device behavior setting operations.

8. The operating method of claim 7, wherein the peripheral device is a mouse device, and the mouse mapping operation of the data source behavior control item when being activated is used to allow the mouse device, which is connected to the electronic display device, to directly operate the specific window to manage a specific data source content of a specific data source device corresponding to the specific window.

9. The operating method of claim 7, wherein the volume adjustment operation of the data source behavior control item is used for changing a volume output level of a specific window corresponding to a specific data source device by adjusting a volume control item on the specific window.

10. The operating method of claim 7, wherein the multiple data source behavior control items respectively comprised by the multiple different windows respectively include multiple device switching control items, and the operating method further comprises:

when the multiple device switching control items are activated, the multiple different windows respectively and simultaneously display the multiple data source contents for a user; and switching between the multiple different windows to select a specific window to control a content of a specific data source corresponding to the specific window according to the user control signal, without moving a cursor position corresponding to the peripheral device onto the specific window.

* * * * *